United States Patent [19]

Park

[11] Patent Number: 4,903,515
[45] Date of Patent: Feb. 27, 1990

[54] HEATING CONTAINER MANUFACTURING APPARATUS

[76] Inventor: Kyong-Kwon Park, Da-dong 101, Shinwha A.P.T., 536-4, Shinweol-dong, Gangseo-ku, Seoul, Rep. of Korea

[21] Appl. No.: 277,709

[22] Filed: Nov. 30, 1988

[30] Foreign Application Priority Data

Oct. 21, 1988 [KR] Rep. of Korea ............... 1988-13768

[51] Int. Cl.⁴ ............................................. B21D 51/22
[52] U.S. Cl. ............................................. 72/85; 72/102
[58] Field of Search ...................... 72/80–85, 72/94, 102, 105, 125, 184, 191

[56] References Cited

U.S. PATENT DOCUMENTS

| | | | |
|---|---|---|---|
| 157,272 | 12/1874 | Conger | 72/81 |
| 238,535 | 3/1881 | Shapley | 72/82 |
| 317,167 | 5/1885 | Mitchell | 72/80 |
| 2,287,091 | 6/1942 | Cushwa et al. | 72/85 |
| 4,117,704 | 10/1978 | Nakache et al. | 72/83 |
| 4,118,846 | 10/1978 | Korte | 72/81 |

FOREIGN PATENT DOCUMENTS

| | | | |
|---|---|---|---|
| 582183 | 9/1958 | Italy | 72/83 |
| 349944 | 12/1960 | Switzerland | 72/83 |

Primary Examiner—Robert L. Spruill
Attorney, Agent, or Firm—Birch, Stewart, Kolasch & Birch

[57] ABSTRACT

A heating container manufacturing apparatus includes a pair of horizontal guide beds disposed on the top of a body and supporting an air cylinder and piston, a movable member connected to the air cylinder and the air piston, a movable plate fabricated and positioned at the bottom of the air piston, guide rods mounted on a moving plate and inserted into guide holes, and a roller connected to the movable plate and having a plurality of teeth for manufacturing a plurality of helical concave members on the outside of the bottom plate of the heating container.

3 Claims, 3 Drawing Sheets

HEATING CONTAINER MANUFACTURING APPARATUS

BACKGROUND OF THE INVENTION

1. Field of the Invention

The present invention relates to a heating container manufacturing apparatus and particularly, to an apparatus for manufacturing a heating container which includes a horizontal air piston member, a vertical air piston member, and a roller having a plurality of teeth for slightly forming a plurality of helical concave members on the outside of the bottom of the heating container and its manufacture.

2. Description of the Prior Art

Conventionally, the outside of the botton of a stainless heating container is attached with a aluminum sheet having high heat absorbing capacity, which is overlaid with the stainless plate.

Although several salient configurations are formed on the stainless bottom plate of the prior art heating container for enlarging the transmittal area, the stainless plate tends to separate from the aluminum sheet attached to the bottom of the heating container since the salient configurations are formed by strongly and heavily pressing to the stainless plate.

SUMMARY OF THE INVENTION

Accordingly, it is an object of the present invention to provide an improved apparatus for manufacturing a heating container and its manufacture.

Another object of the present invention is to provide an apparatus for manufacturing a heating container which includes a horizontal air piston member, a vertical air piston member, and a roller having a plurality of teeth for slightly forming a plurality of helical concave members on the outside of the bottom of the heating container and its manufacture.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a heating container manufacturing apparatus which includes a pair of horizontal guide beds disposed on the top of a body, a movable member connected to an air cylinder and an air piston, a moving plate fabricated and positioned at the bottom of the air piston, guide rods mounted on a moving plate and inserted into guide holes, and a roller having a plurality of teeth for manufacturing a plurality of helical concave members disposed on the outside of the bottom plate of the heating container.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
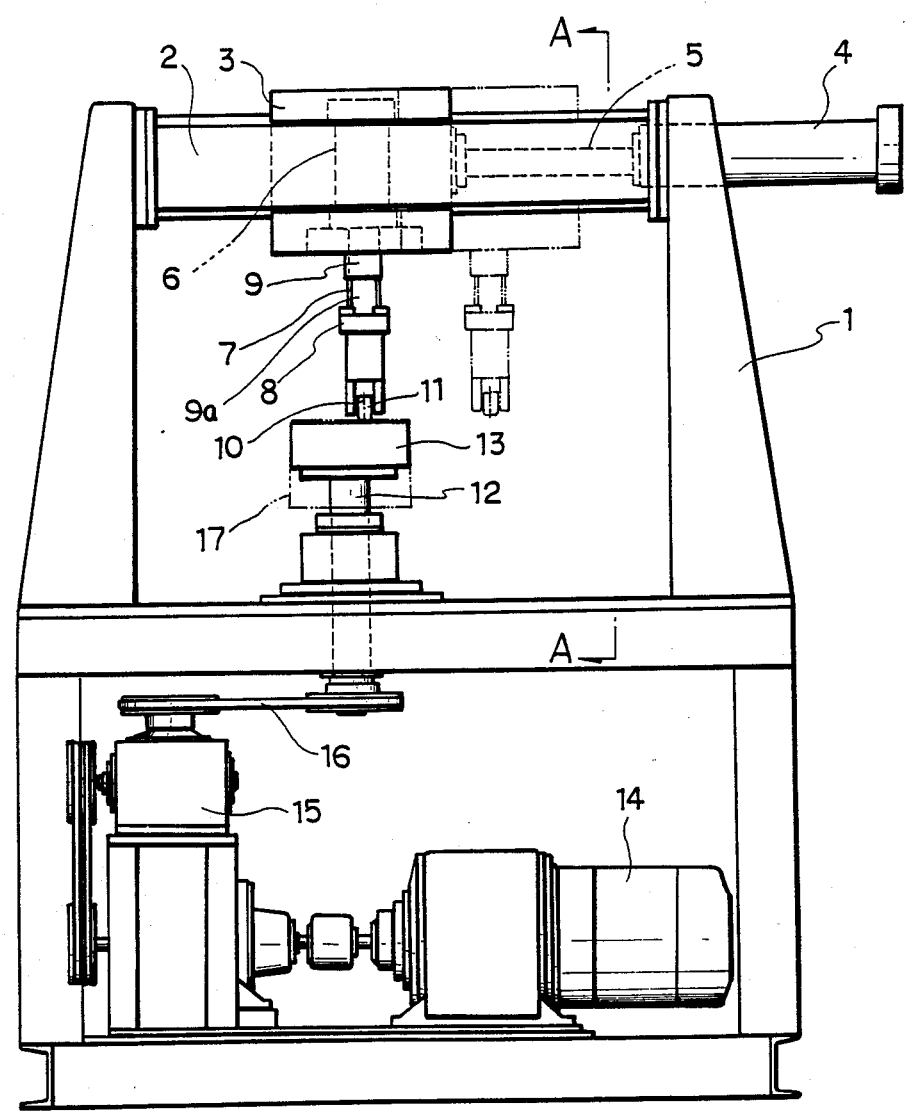
FIG. 1 is a front view of an apparatus according to the present invention.
Figure 2:
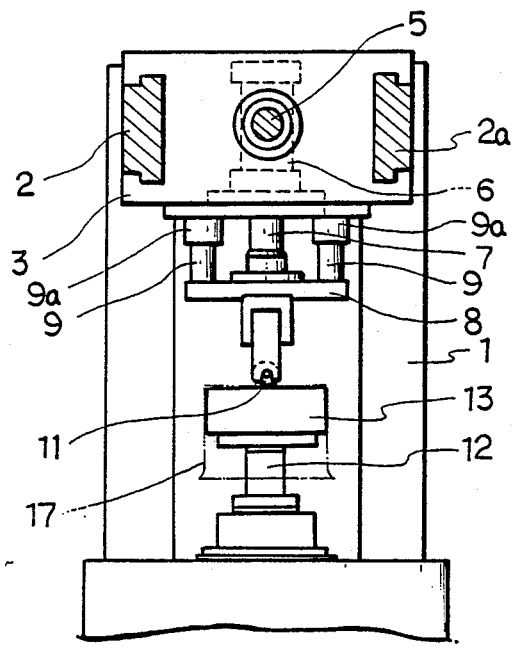
FIG. 2 is a sectional view of FIG. 1, taken along line A—A.
Figure 3:
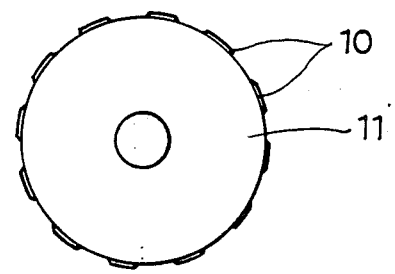
FIG. 3 is a side view of a roller of the apparatus according to the present invention.
Figure 4:
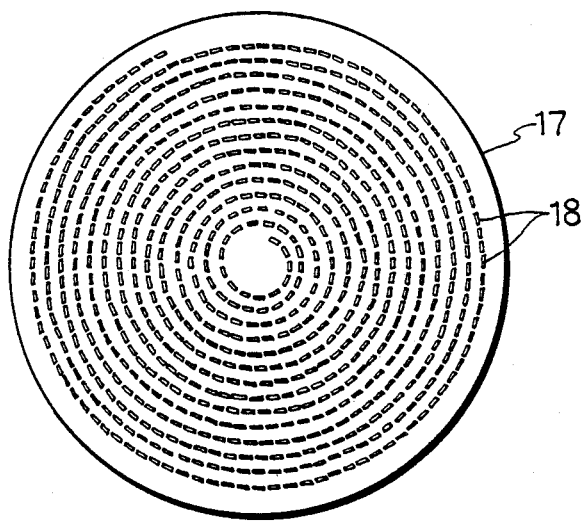
FIG. 4 is an enlarged bottom view of a bottom plate of a heating container according to the present invention.
Figure 5:
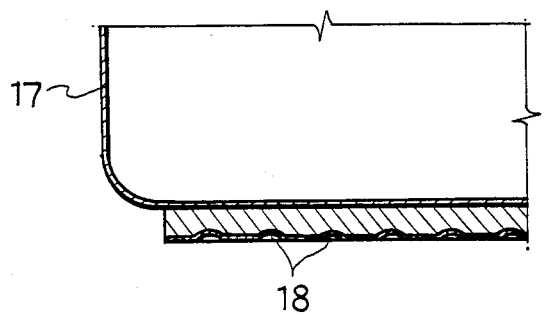
FIG. 5 is a sectional view of the heating container of partially cut away portion of FIG. 4.

Referring now in detail to the drawings for the purpose of illustrating preferred embodiments of the present invention, the heating container and its manufacturing apparatus as shown in FIGS. 1, 2, and 4 comprises a plurality of helical concave members 18 disposed on the outside of the stainless bottom plate of a heating container 17.

The apparatus for manufacturing the heating container of the present invention comprises a rotatable plate 13 supported by a shaft 12 for supporting the heating container 17 thereon with its open face down, a horizontal air cylinder 4 disposed on the top portion of a body 1 for moving in a horizontal air cylinder 5 to left and right directions to be positioned at the center of the heating container 17 put on the rotating plate 13. A moving support 3 is slidably moved along a pair of guide beds 2, 2a. The shaft 12 is connected to a reduction member 15 through a belt 16 and the reduction member 15 is connected to a motor 14.

A vertical air piston 7 is slidably moved in a vertical air cylinder 6. When the vertical air piston pushes down, the bottom plate of the heating container 17 is positioned by being pressed by the plurality of teeth 10 of a roller 11 since the roller 11 is attached to the end part of a moving plate 8 mounted to one end of the vertical air piston 7. A pair of supports 9 stood on the moving plate 8 are slidably engaged in guide holes 9a in the moving support 3. At this time, the motor 14 is operated and the rotatable plate 13 is started to rotate. Therefore, the plurality of concave members 18 are formed as a helical configuration on the outside of the bottom plate of the heating container 7 when the horizontal air piston 5 is moved with the moving support 3 to the outside.

Therefore, the plurality of concave members 18 are not formed in an instant but are formed individually and slowly by the plurality of teeth of the roller 11 in accordance with the revolution of the roller 11 so that the pressing force applied to the bottom plate of the heating container 17 is not strong and heavy. Accordingly, the stainless bottom plate attached to the aluminum sheet formed as the bottom of the heating container 17 is prevented from separating from the aluminum bottom sheet. Also the plurality of concave members 18 formed on the stainless bottom plate of the heating container 17 increase the heat efficiency by enlarging the heating area.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for manufacturing a heating container which comprises:
   a body,
   a moving support slidably moved along a pair of guide beds disposed on the top portion of said body,
   a horizontal air piston slidably engaged in a horizontal air cylinder disposed on the top portion of said body, said horizontal air piston being connected to said moving support for slidably moving said moving support along said pair of guide beds,
   a vertical air piston being slidably engaged in a vertical air cylinder disposed in said moving support,
   a roller rotatably attached to the bottom of said vertical air piston through connecting means, said roller having a plurality of teeth disposed thereon,
   a rotatable plate mounted on a shaft below said roller for supporting said heating container thereon with its open face down so that the bottom of the heating container is rollingly pressed by said roller, and
   a motor means connected to said rotatable plate through transferring means for rotating said rotatable plate.

2. The apparatus of claim 1, wherein the connecting means includes a moving plate having a pair of guide rods slidably engaged in guide holes in said moving support.

3. The apparatus of claim 1, wherein the transferring means includes a reduction member which is connected to said motor means at one end and connected to said shaft through a belt at the other end.

* * * * *

UNITED STATES PATENT AND TRADEMARK OFFICE
CERTIFICATE OF CORRECTION

PATENT NO. : 4,903,515
DATED : February 27, 1990
INVENTOR(S) : Hyong-Kwon PARK

It is certified that error appears in the above-identified patent and that said Letters Patent is hereby corrected as shown below:

On the title page;

In category "[76] Inventor", please change

"Kyong-Kwon Park" to --Hyong-Kwon Park--.

Signed and Sealed this

Twenty-eighth Day of May, 1991

*Attest:*

HARRY F. MANBECK, JR.

*Attesting Officer*  *Commissioner of Patents and Trademarks*